United States Patent
Edamitsu et al.

(10) Patent No.: US 10,120,122 B2
(45) Date of Patent: Nov. 6, 2018

(54) PLANAR LIGHTING DEVICE WITH EXTERNAL CONNECTION SECTION

(71) Applicant: MINEBEA MITSUMI Inc., Nagano (JP)

(72) Inventors: Takashi Edamitsu, Fukuroi (JP); Makoto Furuta, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/804,338

(22) Filed: Nov. 6, 2017

(65) Prior Publication Data

US 2018/0149805 A1      May 31, 2018

(30) Foreign Application Priority Data

Nov. 30, 2016   (JP) .................. 2016-232584

(51) Int. Cl.
*F21V 8/00*      (2006.01)
*H01R 12/71*    (2011.01)

(52) U.S. Cl.
CPC ......... *G02B 6/0083* (2013.01); *G02B 6/0068* (2013.01); *H01R 12/71* (2013.01)

(58) Field of Classification Search
CPC ..... G02B 6/0083; G02B 6/0068; H01R 12/71
See application file for complete search history.

(56) References Cited

FOREIGN PATENT DOCUMENTS

JP    2008-298905 A    12/2008

*Primary Examiner* — Joseph L Williams
(74) *Attorney, Agent, or Firm* — Pearne & Gordon LLP

(57) ABSTRACT

A planar lighting device includes: a board that includes a strip-shaped section, and an external connection section, which protrudes from the central part of the strip-shaped section in a lateral direction of the strip-shaped section, and that is provided with an installation surface; and light source units that are provided with a plurality of light sources connected in series, that are each provided with a first electrode and a second electrode on both end sides, and that are arranged side by side on the installation surface at the strip-shaped section of the board in a longitudinal direction. Furthermore, the single external connection section is provided for the light source units, and the first electrodes in all the light source units, related to the single external connection section, are located farther from the external connection section than the second electrodes in the light source units.

6 Claims, 9 Drawing Sheets

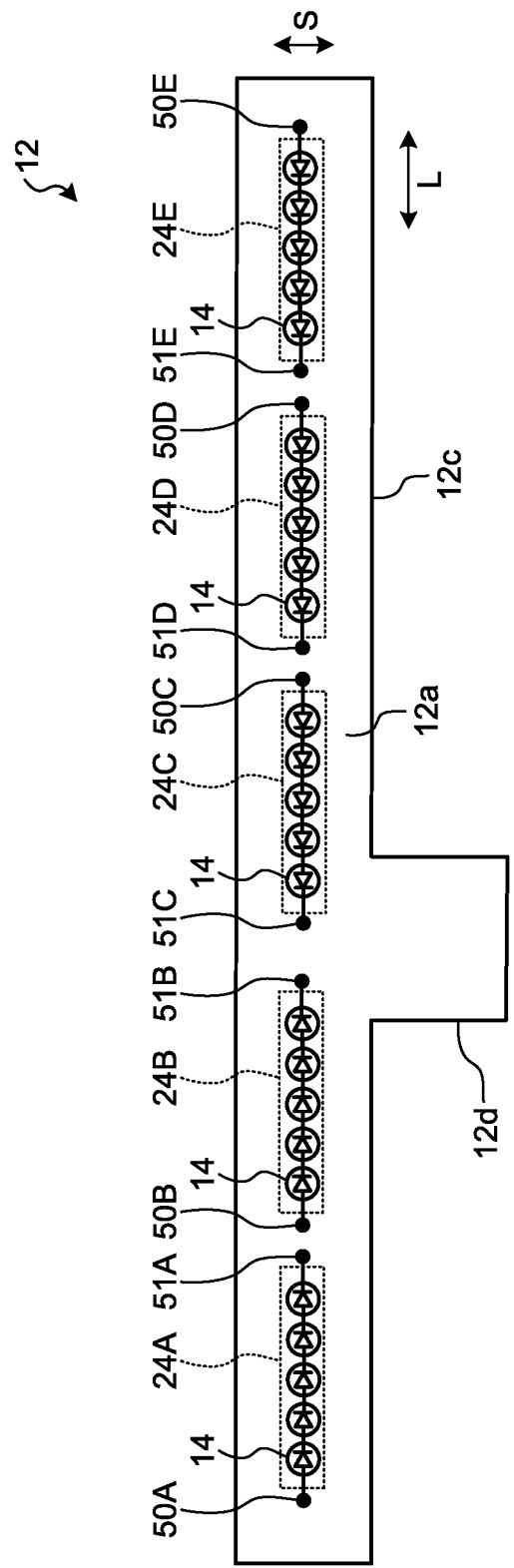

PLANAR LIGHTING DEVICE WITH EXTERNAL CONNECTION SECTION

CROSS-REFERENCE TO RELATED APPLICATION(S)

The present application claims priority to and incorporates by reference the entire contents of Japanese Patent Application No. 2016-232584 filed in Japan on Nov. 30, 2016.

BACKGROUND OF THE INVENTION

1. Field of the Invention

The present invention relates to a planar lighting device.

2. Description of the Related Art

In some planar lighting devices, a top-view type light emitting diode (LED) is provided such that it is opposed to the side surface of a light guide plate. In the planar lighting devices, for instance, light source units are connected in parallel, which are configured by connecting multiple LEDs in series (for example, see Japanese Laid-open Patent Publication No. 2008-298905).

However, if multiple light source units are connected in parallel, a lot of wiring needs to be laid alongside on a board, where the light source units are installed, in a lateral direction of the board; therefore, the width of the board needs to be wider in the lateral direction. Thus, there is a possibility that a problem occurs with a reduction in the thickness of planar lighting devices due to the effect of the width of the board in the lateral direction.

SUMMARY OF THE INVENTION

A planar lighting device according to an embodiment includes a board that includes a strip-shaped section, which has a strip shape, and an external connection section, which protrudes from the central part of the strip-shaped section in a lateral direction of the strip-shaped section, and that is provided with an installation surface, which is one principal surface, and a wiring surface, which is a surface at the opposite side of the installation surface; light source units that are provided with a plurality of light sources connected in series, that are each provided with a first electrode and a second electrode on both end sides, and that are arranged side by side on the installation surface at the strip-shaped section of the board in a longitudinal direction, the emission surface of the light source being opposed to the side surface of a light guide plate; first wiring that is provided on the wiring surface and that is commonly connected between the external connection section and the first electrode; and second wiring that is provided on the wiring surface and that is connected between the external connection section and the second electrode. Furthermore, the single external connection section is provided for the light source units, and the first electrodes in all the light source units, related to the single external connection section, are located farther from the external connection section than the second electrodes in the light source units.

BRIEF DESCRIPTION OF THE DRAWINGS

FIG. 6A is a front view that schematically illustrates the side of the installation surface of the board according to a modified example 1 of the embodiment;

DETAILED DESCRIPTION OF THE PREFERRED EMBODIMENTS

Figure 1:
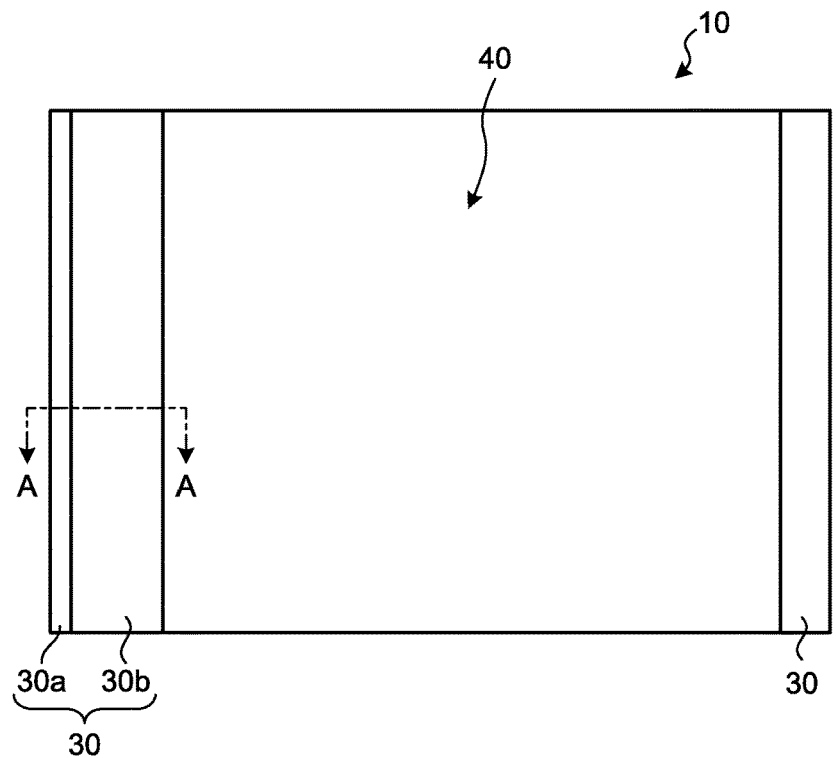
FIG. 1 is a front view that illustrates an example of the external appearance of a planar lighting device according to an embodiment.

With reference to the drawings, an explanation is given below of a planar lighting device according to an embodiment. Here, the relationship between elements in dimension, the ratio between elements, or the like, in the drawings sometimes differ from reality. In some cases, the drawings may include parts, of which the relationship in dimension or the ratio between them is different.

Outline of the Planar Lighting Device

First, the outline of a planar lighting device 10 is explained by using FIG. 1. FIG. 1 is a front view that illustrates an example of the external appearance of the planar lighting device 10 according to the embodiment. As illustrated in FIG. 1, the planar lighting device 10 according to the embodiment outputs light from a valid area 40 that is an emission area that is not covered with a light shielding sheet 30. That is, the valid area 40 is defined by the light shielding sheet 30.

The planar lighting device 10 according to the embodiment is used as backlight of a liquid crystal display device. Such a liquid crystal display device is used for, for example, a smartphone.

Furthermore, in FIG. 1, the light shielding sheet 30 on the left side is wider than the light shielding sheet 30 on the right side. This is because the light shielding sheet 30 on the right side covers a relatively narrow area that does not include an LED 14, a board 12, or the like, which is described later, while the light shielding sheet 30 on the left side covers a relatively wide area that includes the LED 14, the board 12, or the like, which is described later. The width of the light shielding sheet 30 on the left side is for example 1.5 mm.

Detailed Configuration of the Planar Lighting Device

Figure 2:
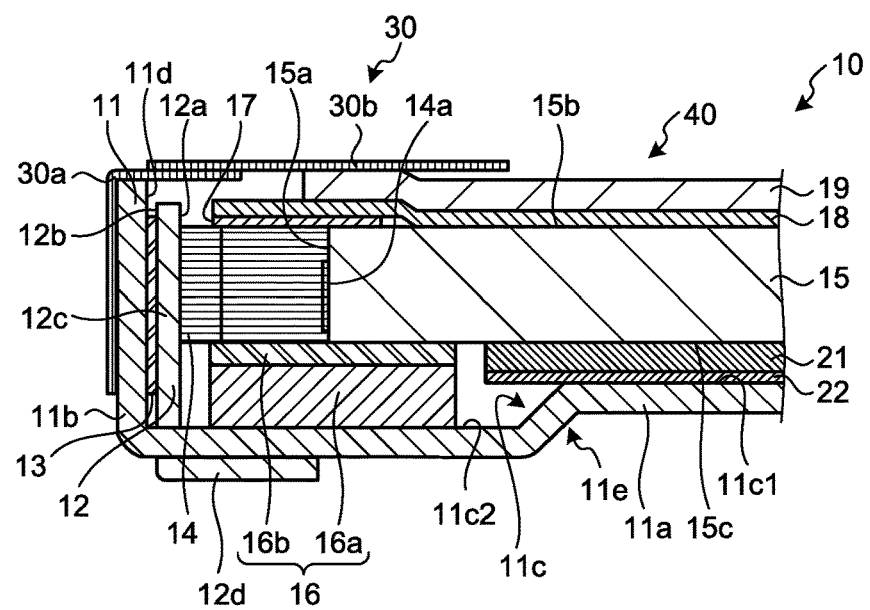
FIG. 2 is a cross-sectional view taken along the line A-A in FIG. 1.

Next, the detailed configuration of the planar lighting device 10 is explained by using FIG. 2. FIG. 2 is a cross-sectional view taken along the line A-A in FIG. 1. As illustrated in FIG. 2, the planar lighting device 10 includes a frame 11, the board 12, a connection member 13, the LED 14, a light guide plate 15, a first connection member 16, a second connection member 17, a diffuse sheet 18, a prism sheet 19, a reflection sheet 21, and the light shielding sheet 30.

The frame 11 is a member that houses the board 12, the connection member 13, the LED 14, the light guide plate 15, the first connection member 16, the second connection member 17, the diffuse sheet 18, and the prism sheet 19. The frame 11 is, for example, a stainless-steel plate frame that has high rigidity and optical reflectivity. The frame 11 includes a bottom section 11a and a side wall section 11b.

The bottom section 11a is a section that spreads along a back surface 15c, described later, of the light guide plate 15. The bottom section 11a includes a bottom surface 11c. The bottom surface 11c includes a plain surface 11c1 and a recessed surface 11c2 that is formed on a recessed section 11e that is described later. Furthermore, at least parts of the LED 14 and the light guide plate 15 are placed on the recessed surface 11c2.

The side wall section 11b is a section that is integrally raised from the bottom section 11a in a light output direction (the normal direction of the plain surface 11c1 of the bottom surface 11c) along the long side of a side surface 15a, described later, of the light guide plate 15. The side wall section 11b includes a side surface 11d.

Furthermore, the recessed section 11e is formed on the bottom section 11a. The recessed section 11e is a section that is formed to be recessed along the side surface 11d from the part of the bottom surface 11c on the side of the side surface 11d in the direction opposite to the direction in which light is output. The recessed section 11e includes the recessed surface 11c2 on its bottom section. Furthermore, the width of the recessed section 11e is formed such that the first connection member 16 is provided on the recessed surface 11c2.

The board 12 is, for example, a Flexible Printed Circuit (FPC). The board 12 is a board that includes two principal surfaces and has the LED 14 installed on an installation surface 12a that is one of the principal surfaces. Furthermore, on a wiring surface 12b, which is the principal surface on the opposite side of the installation surface 12a, first wiring 60 (see FIG. 3B) and second wiring 61A to 61D (see FIG. 3B) are provided.

The board 12 includes a strip-shaped section 12c, which is shaped like a strip, and an external connection section 12d, which protrudes downward from the bottom side of the strip-shaped section 12c. The external connection section 12d is inserted through a through-hole (not illustrated) that is formed on the recessed section 11e of the frame 11 and is bent toward the plain surface 11c1 on the side of the surface opposite to the recessed surface 11c2 of the recessed section 11e.

Furthermore, on the board 12, the first wiring 60 and the second wiring 61A to 61D are formed such that the external connection section 12d is connected to the LEDs 14. Furthermore, the external connection section 12d is connected to an external power source (not illustrated), and electric power is supplied to the LEDs 14 from the external power source via the first wiring 60 and the second wiring 61A to 61D so that the LEDs 14 may emit light. The detailed configuration of the board 12 is described later.

The connection member 13 is a member that secures the board 12 to the side surface 11d of the frame 11. The connection member 13 is, for example, an insulating double-sided tape. Furthermore, one side of the connection member 13 is secured to the wiring surface 12b of the board 12, and the other side is secured to the side surface 11d, whereby the board 12 is fixed to the side surface 11d.

The LED 14 is a point-like light source (point light source). The LED 14 is, for example, a pseudo-white LED that is made up of a blue LED and a yellow fluorescent material. The LED 14 is what is called a top-view type LED that is shaped like a cuboid as a whole and that has an emission surface 14a as a surface on the opposite side of the surface that is installed on the board 12.

According to the embodiment, the multiple LEDs 14 are provided. Furthermore, the LEDs 14 are arranged side by side along the direction of the long side of the side surface 15a in a state where the emission surface 14a is opposed to the side surface 15a of the light guide plate 15. Furthermore, the LEDs 14 emit light toward the side surface 15a. In this way, the LEDs 14 emit light that enters the side surface 15a of the light guide plate 15. The detailed arrangement of the LEDs 14 is described later.

The light guide plate 15 is formed like a flat plate by using transparent material (e.g., polycarbonate resin). The light guide plate 15 includes the side surface 15a, a principal surface 15b, and the back surface 15c on its outer surfaces.

The side surface 15a is an incidence surface on which light is incident after being emitted from the emission surface 14a of the LED 14. Furthermore, the principal surface 15b is an output surface from which light is output outside after entering from the side surface 15a. Moreover, for example, an optical-path change pattern, including a plurality of dots, is formed on the back surface 15c that is the surface on the opposite side of the principal surface 15b.

Due to the formation of the optical-path change pattern, the direction of light travelling within the light guide plate 15 is changed so that light is efficiently output from the principal surface 15b. That is, the planar lighting device 10 according to the embodiment is what is called an edge-light type lighting device.

The first connection member 16 is a member that is provided between the LED 14 with the light guide plate 15 and the recessed surface 11c2 of the bottom surface 11c and that optically and mechanically connects the light guide plate 15 and the LED 14.

Specifically, the first connection member 16 connects the emission surface 14a of the LED 14 and the side surface 15a of the light guide plate 15 in such a state that the optical axis (e.g., the center in the thickness direction of the LED 14) of the LED 14 matches the optical axis (e.g., the center in the thickness direction of the light guide plate 15) of the light guide plate 15 or in such a state that the lower surface of the LED 14 is flush with the back surface 15c of the light guide plate 15. The first connection member 16 is a member that includes a base material 16a and an adhesive layer 16b, and only the side of the adhesive layer 16b is adhesive.

The base material 16a is for example PET, and the adhesive layer 16b is for example a double-sided tape. The adhesive layer 16b adheres to at least part of the back surface 15c of the light guide plate 15 in the vicinity of the LED 14, and it adheres to at least part of the surface of the LED 14 on the side of the bottom surface 11c in the vicinity of the light guide plate 15.

The first connection member 16 is attached with at least part of the surface of the LED 14 on the side of the bottom surface 11c and at least part of the back surface 15c of the light guide plate 15. Thus, the first connection member 16 may connect the emission surface 14a of the LED 14 and the side surface 15a of the light guide plate 15.

For example, even if the thickness of the LED 14 is different from the thickness of the light guide plate 15, the LED 14 and the light guide plate 15 may be connected in such a manner that the surface of the LED 14 on the side of the bottom surface 11c is flush with the back surface 15c of the light guide plate 15. Therefore, according to the embodiment, the first connection member 16 allows stability of the light combining efficiency of the LED 14 and the light guide plate 15.

Here, an explanation is given of a case where both the two sides of the first connection member 16 are adhesive. In this case, the LED 14 and the light guide plate 15 are secured to the bottom surface 11c. Therefore, if some force is applied to the planar lighting device 10 from outside, there is a possibility that the LED 14 and the light guide plate 15 are damaged without releasing the force.

However, only the side of the first connection member 16 according to the embodiment, on which the adhesive layer 16b is provided, is adhesive and therefore the LED 14 and the light guide plate 15 are not secured to the bottom surface 11c. This allows the LED 14 and the light guide plate 15 to release forces from outside. Thus, with the planar lighting device 10 according to the embodiment, it is possible to prevent the occurrence of damages on the LED 14 and the light guide plate 15.

The second connection member 17 is a member that is provided on the opposite side of the first connection member 16 with respect to the LED 14 and the light guide plate 15 and that connects the LED 14 and the light guide plate 15 optically and mechanically. Specifically, the second connection member 17 connects the emission surface 14a of the LED 14 and the side surface 15a of the light guide plate 15. The second connection member 17 is provided between the diffuse sheet 18, which is described later, and the LED 14 with the light guide plate 15.

The second connection member 17 is for example a double-sided tape; one of the sides adheres to at least part of the surface of the LED 14 on the opposite side of the bottom surface 11c in the vicinity of the light guide plate 15, and it adheres to at least part of the principal surface 15b of the light guide plate 15 in the vicinity of the LED 14.

That is, the second connection member 17 is attached with at least part of the surface of the LED 14 on the opposite side of the bottom surface 11c and at least part of the principal surface 15b of the light guide plate 15. Therefore, the second connection member 17 may connect the emission surface 14a of the LED 14 and the side surface 15a of the light guide plate 15.

Furthermore, the other side of the second connection member 17 adheres to at least part of the diffuse sheet 18 on the side of the side wall section 11b. This allows the second connection member 17 to fix the diffuse sheet 18 to the light guide plate 15, thereby preventing the diffuse sheet 18 from coming off the light guide plate 15. Therefore, according to the embodiment, it is possible to prevent degradation in luminance characteristics, such as the luminance or the luminance distribution of light that is output from the valid area 40.

The diffuse sheet 18 is a member that is provided on the side of the principal surface 15b of the light guide plate 15 and that diffuses light that is output from the principal surface 15b. Specifically, the diffuse sheet 18 is provided so as to cover the principal surface 15b and at least part of the surface of the LED 14 on the opposite side of the bottom surface 11c.

The prism sheet 19 is a member that is provided on the opposite side of the light guide plate 15 with respect to the diffuse sheet 18 and that conducts light distribution control on the light, diffused by the diffuse sheet 18, and outputs the light, on which the light distribution control has been conducted.

The reflection sheet 21 is a member that reflects light that escapes from the back surface 15c of the light guide plate 15 and returns it to the light guide plate 15 again. The reflection sheet 21 is provided between the back surface 15c of the light guide plate 15 and the bottom surface 11c in such a state that it is fixed to the plain surface 11c1 of the bottom surface 11c with a double-sided tape 22.

The double-sided tape 22 is for example a white double-sided tape; one of the sides adheres to part of the reflection sheet 21, and the other side adheres to the plain surface 11c1 of the bottom surface 11c. Thus, the reflection sheet 21 is secured to the bottom surface 11c.

The light shielding sheet 30 is a member that is provided to cover part of the prism sheet 19 on the side of the side wall section 11b and that blocks light that is output from some area of the principal surface 15b of the light guide plate 15, thereby defining the valid area 40, through which light is output from the planar lighting device 10.

The light shielding sheet 30 includes a first light shielding sheet 30a and a second light shielding sheet 30b. The first light shielding sheet 30a is for example a one-sided tape that is capable of blocking light, and a section at one end side adheres to the outer surface of the side wall section 11b of the frame 11.

The second light shielding sheet 30b is for example a double-sided tape that is capable of blocking light. Out of the two surfaces of the second light shielding sheet 30b, one end side of one of the surfaces adheres to a section of the first light shielding sheet 30a at the other end side, and the other end side of one of the surfaces adheres to a section of the prism sheet 19 on the side of the side wall section 11b.

Furthermore, the other one of the surfaces of the second light shielding sheet 30b adheres to the liquid crystal display device (not illustrated), which uses the planar lighting device 10 as a backlight. Thus, the planar lighting device 10 may be fixed to the liquid crystal display device.

Detailed Configuration of the Board and Detailed Arrangement of the LED

Figure 3A:
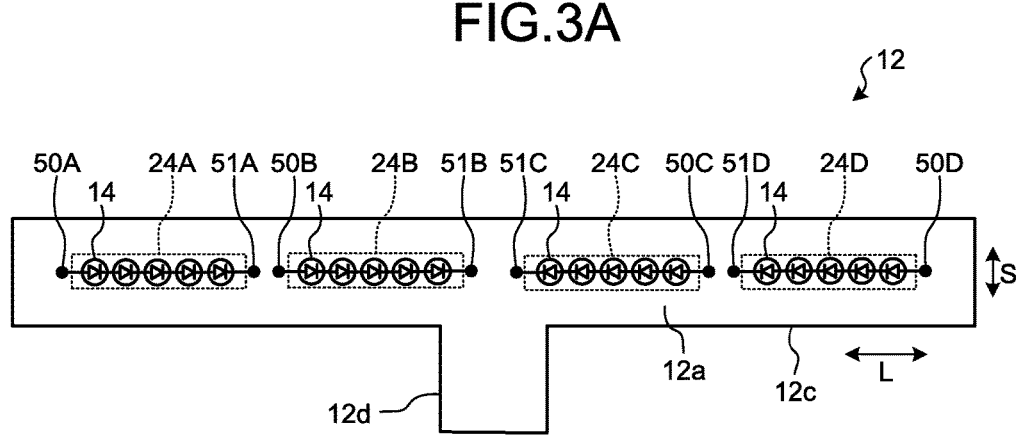
FIG. 3A is a front view that schematically illustrates the side of an installation surface of a board according to the embodiment.
Figure 3B:
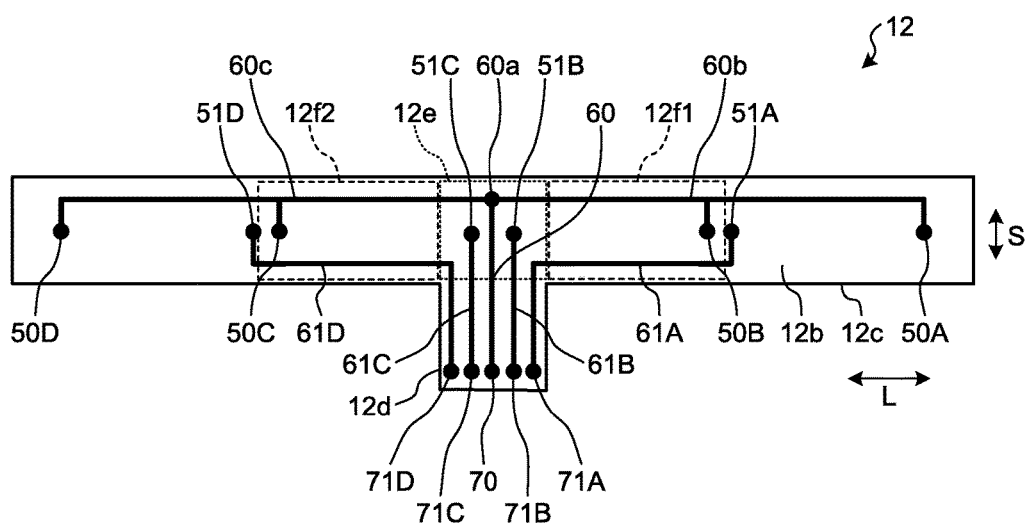
FIG. 3B is a front view that schematically illustrates the side of a wiring surface of the board according to the embodiment.

Next, with reference to FIG. 3A and FIG. 3B, an explanation is given of the detailed configuration of the board 12 and the detailed arrangement of the LED 14 according to the embodiment. FIG. 3A is a front view that schematically illustrates the side of the installation surface 12a of the board 12 according to the embodiment, and FIG. 3B is a front view that schematically illustrates the side of the wiring surface 12b of the board 12 according to the embodiment.

As illustrated in FIG. 3A and FIG. 3B, the board 12 includes the strip-shaped section 12c and the external connection section 12d. The strip-shaped section 12c is an elongated strip-shaped member. The external connection section 12d is a member that protrudes in a lateral direction S of the strip-shaped section 12c from the central part with respect to a longitudinal direction L of the strip-shaped section 12c.

Furthermore, the "strip shape" according to the present embodiment does not need to be straight, as illustrated in FIG. 3A, FIG. 3B, or the like, and it may be for example curved or bent corresponding to the shape of the side surface 15a of the light guide plate 15, or the like.

Furthermore, as illustrated in FIG. 3A, light source units 24A to 24D, in which the LEDs 14 are connected in series, are provided on the installation surface 12a at the strip-shaped section 12c of the board 12. For example, as illustrated in FIG. 3A, each of the light source units 24A to 24D is provided with the five LEDs 14.

Here, the number of the LEDs 14, provided on the single light source unit 24, is not limited to 5, but it may be any number. Furthermore, the number of the LEDs 14, provided in each of the light source units 24, may be different. Furthermore, as described above, if the light source units 24A to 24D are collectively mentioned in the following explanation, they are sometimes referred to as the light source unit 24.

The light source units 24A to 24D include positive electrodes 50A to 50D, which are first electrodes, and negative electrodes 51A to 51D, which are second electrodes. Furthermore, in the following explanation, if the positive electrodes 50A to 50D are collectively mentioned, they are sometimes referred to as a positive electrode 50 and, if the negative electrodes 51A to 51D are collectively mentioned, they are sometimes referred to as a negative electrode 51.

Furthermore, in the single light source unit 24, the LEDs 14 are arranged side by side in the longitudinal direction L of the strip-shaped section 12c, the positive electrode 50 is provided on one end side in the longitudinal direction L, and the negative electrode 51 is provided on the other end side. Moreover, the four light source units 24A to 24D are arranged side by side in the longitudinal direction L of the strip-shaped section 12c.

Among the four light source units 24A to 24D, the light source units 24A, 24B are provided on one side (the left side in FIG. 3A) of the strip-shaped section 12c with the external connection section 12d as a base point. Furthermore, the remaining light source units 24C, 24D are provided on the other side (the right side in FIG. 3A) of the strip-shaped section 12c with the external connection section 12d as a base point.

Here, all the positive electrodes 50A to 50D in the four light source units 24A to 24D are located farther from the external connection section 12d than the corresponding negative electrodes 51A to 51D. That is, in all the light source units 24, the negative electrode 51 is located closer to the external connection section 12d than the corresponding positive electrode 50.

Next, with reference to FIG. 3B, an explanation is given of the configuration of wiring for supplying electric power to the four light source units 24A to 24D.

Each of the positive electrodes 50A to 50D and the negative electrodes 51A to 51D in the above-described four light source units 24A to 24D leads to the wiring surface 12b, which is a principal surface of the board 12 on the opposite side, through a penetrating via, or the like. Therefore, in the following embodiment, to facilitate understanding, the parts on the side of the wiring surface 12b, connected through penetrating vias, or the like, are also referred to as the positive electrodes 50A to 50D and the negative electrodes 51A to 51D.

On the side of the wiring surface 12b of the external connection section 12d, a first terminal 70 is provided, which is connected to a high voltage side of the external power source (not illustrated). Furthermore, the first terminal 70 is connected to the first wiring 60. The first wiring 60 extends from the first terminal 70 in the lateral direction S of the strip-shaped section 12c, passes through the interval between the negative electrode 51B and the negative electrode 51C, and leads to a contact point 60a. Here, the contact point 60a is located closer to the long side of the strip-shaped section 12c on the opposite side of the long side on which the external connection section 12d is provided.

Furthermore, the first wiring 60 bifurcates at the contact point 60a to both end sides in the longitudinal direction L of the strip-shaped section 12c, and bifurcated first wiring 60b, 60c extend in the longitudinal direction L. Furthermore, among the bifurcated first wiring 60, the first wiring 60b, which extends to the side where the light source units 24A, 24B are provided, further extend in the lateral direction S of the strip-shaped section 12c from the neighborhoods of the positive electrodes 50A, 50B, thereby leading to the positive electrodes 50A, 50B, respectively.

Furthermore, among the bifurcated first wiring 60, the first wiring 60c, which extends to the side where the light source units 24C, 24D are provided, further extend in the lateral direction S of the strip-shaped section 12c from the neighborhoods of the positive electrodes 50C, 50D, thereby leading to the positive electrodes 50C, 50D, respectively. As explained above, the first wiring 60 is connected between the first terminal 70 and the positive electrodes 50A to 50D with a single common wiring.

Next, an explanation is given of the configuration of wiring that is connected between the negative electrodes 51A to 51D in the four light source units 24A to 24D and the external connection section 12d. The second wiring 61A is connected to the negative electrode 51A in the light source unit 24A. The second wiring 61A extends in the lateral direction S along a direction toward the external connection section 12d and then extends in the longitudinal direction L along a direction toward the external connection section 12d.

Then, the second wiring 61A is turned in the lateral direction S along a direction toward the external connection section 12d at an opposing area 12e, which is an area that is opposed to the external connection section 12d in the strip-shaped section 12c, to lead to a second terminal 71A that is provided on the side of the wiring surface 12b of the external connection section 12d.

Furthermore, in addition to the second terminal 71A, second terminals 71B, 71C, and 71D are provided on the side of the wiring surface 12b of the external connection section 12d. All of the second terminals 71A to 71D are terminals that are connected to a low voltage side of the external power source. Furthermore, in the following explanation, if the second terminals 71A to 71D are collectively mentioned, they are sometimes referred to as a second terminal 71.

Furthermore, the second terminals 71A to 71D are arranged alongside in the longitudinal direction L on the edge of the external connection section 12d on the side toward protrusion in the order of the second terminal 71A, the second terminal 71B, the second terminal 71C, and the second terminal 71D. Moreover, the above-described first terminal 70 is provided between the second terminal 71B and the second terminal 71C.

Furthermore, according to the embodiment, the first terminal 70 and the second terminals 71A to 71D are all provided on the side of the wiring surface 12b of the board 12. However, at least one of the first terminal 70 and the second terminals 71A to 71D may be provided on the side of the installation surface 12a at the external connection section 12d by, for example, laying the first wiring 60 or the second wiring 61A to 61D to the side of the installation surface 12a through penetrating vias, or the like.

The second wiring 61B is connected to the negative electrode 51B of the light source unit 24B. The second wiring 61B extends in the lateral direction S along a direction toward the external connection section 12d, passes between the first wiring 60 and the second wiring 61A, and leads to the second terminal 71B.

The second wiring 61C is connected to the negative electrode 51C of the light source unit 24C. The second wiring 61C extends in the lateral direction S along a direction toward the external connection section 12d, passes between the first wiring 60 and the second wiring 61D, which is described later, and leads to the second terminal 71C.

The second wiring 61D is connected to the negative electrode 51D of the light source unit 24D. The second wiring 61D extends in the lateral direction S along a direction toward the external connection section 12d and then extends in the longitudinal direction L along a direction toward the external connection section 12d. Then, the second wiring 61D is turned in the lateral direction S along a direction toward the external connection section 12d at the opposing area 12e of the strip-shaped section 12c to lead to the second terminal 71D.

As described above, the second wiring 61A to 61D are individually connected between the second terminals 71A to 71D and the negative electrodes 51A to 51D. Furthermore, in the following explanation, if the second wiring 61A to 61D are collectively mentioned, they are sometimes referred to as the second wiring 61.

In the above-described embodiment, the number of pieces of parallel wiring, which extend in the longitudinal direction L of the strip-shaped section 12c and are laid alongside in the lateral direction S, is two at a maximum. The two pieces of parallel wiring are made up of the first wiring 60b and the second wiring 61A at an area 12f1 from the edge of the opposing area 12e in the strip-shaped section 12c to the negative electrode 51A.

Furthermore, the two pieces of parallel wiring are also made up of the first wiring 60c and the second wiring 61D at an area 12f2 from the edge of the opposing area 12e in the strip-shaped section 12c to the negative electrode 51D.

In this way, according to the embodiment, if wiring is connected in parallel from the single external connection section 12d to the four light source units 24A to 24D, the number of pieces of parallel wiring, which extend in the longitudinal direction L of the strip-shaped section 12c and are laid alongside in the lateral direction S, may be two at a maximum.

Next, with reference to FIG. 4A to FIG. 5B, an explanation is given of how the number of pieces of parallel wiring, which extend in the longitudinal direction L of the strip-shaped section 12c and are laid alongside in the lateral direction S, are changed according to various comparative examples if wiring is connected in parallel from the single external connection section 12d to the four light source units 24A to 24D.

Figure 4A:
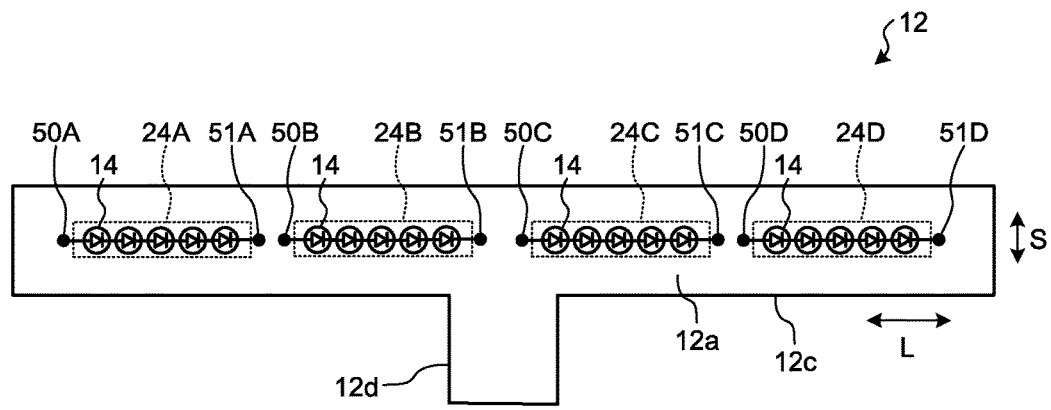
FIG. 4A is a front view that schematically illustrates the side of the installation surface of the board according to a comparative example 1.
Figure 4B:
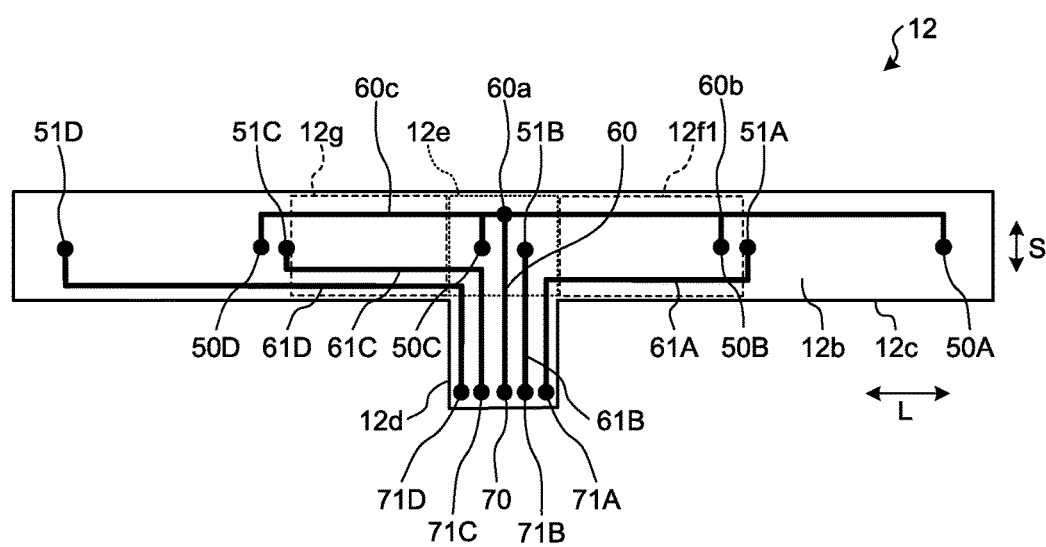
FIG. 4B is a front view that schematically illustrates the side of the wiring surface of the board according to the comparative example 1.

FIG. 4A is a front view that schematically illustrates the side of the installation surface 12a of the board 12 according to a comparative example 1, and FIG. 4B is a front view that schematically illustrates the side of the wiring surface 12b of the board 12 according to the comparative example 1.

Here, according to the comparative example 1, among the four light source units 24A to 24D, the orientations of the positive electrodes 50C, 50D and the negative electrodes 51C, 51D in the light source units 24C, 24D are different from those in the embodiment. As other parts are the same as those in the embodiment, explanations for the same parts are omitted.

As illustrated in FIG. 4A, among the four light source units 24A to 24D, the positive electrodes 50A, 50B of the light source units 24A, 24B are located farther from the external connection section 12d than the corresponding negative electrodes 51A, 51B. Meanwhile, the positive electrodes 50C, 50D in the remaining light source units 24C, 24D are located closer to the external connection section 12d than the corresponding negative electrodes 51C, 51D. In other words, in all the light source units 24, the orientations of the positive electrode 50 and the negative electrode 51 are all set the same.

In this arrangement of the light source units 24C, 24D, the first wiring 60 and the second wiring 61C, 61D, connected to the light source units 24C, 24D, are arranged as illustrated in FIG. 4B.

Among the first wiring 60 that bifurcates at the contact point 60a, the first wiring 60c, which extends to the side where the light source units 24C, 24D are provided, further extends in the lateral direction S of the strip-shaped section 12c from the neighborhoods of the positive electrodes 50C, 50D, and then lead to the positive electrodes 50C, 50D, respectively.

The second wiring 61C, connected to the negative electrode 51C of the light source unit 24C, extends in the lateral direction S along a direction toward the external connection section 12d and then extends in the longitudinal direction L along a direction toward the external connection section 12d. Then, the second wiring 61C is turned in the lateral direction S along a direction toward the external connection section 12d at the opposing area 12e of the strip-shaped section 12c to lead to the second terminal 71C.

The second wiring 61D, connected to the negative electrode 51D of the light source unit 24D, extends in the lateral direction S along a direction toward the external connection section 12d and then extends in the longitudinal direction L along a direction toward the external connection section 12d. Then, the second wiring 61D is turned at the opposing area 12e in the lateral direction S along a direction toward the external connection section 12d to lead to the second terminal 71D.

According to the comparative example 1 that provides the above-described wiring arrangement, the number of pieces of parallel wiring, which extend in the longitudinal direction L of the strip-shaped section 12c and are laid alongside in the lateral direction S, is three at a maximum. The three pieces of parallel wiring are made up of the first wiring 60c, the second wiring 61C, and the second wiring 61D at an area 12g from the edge of the opposing area 12e in the strip-shaped section 12c to the negative electrode 51C.

Figure 5A:
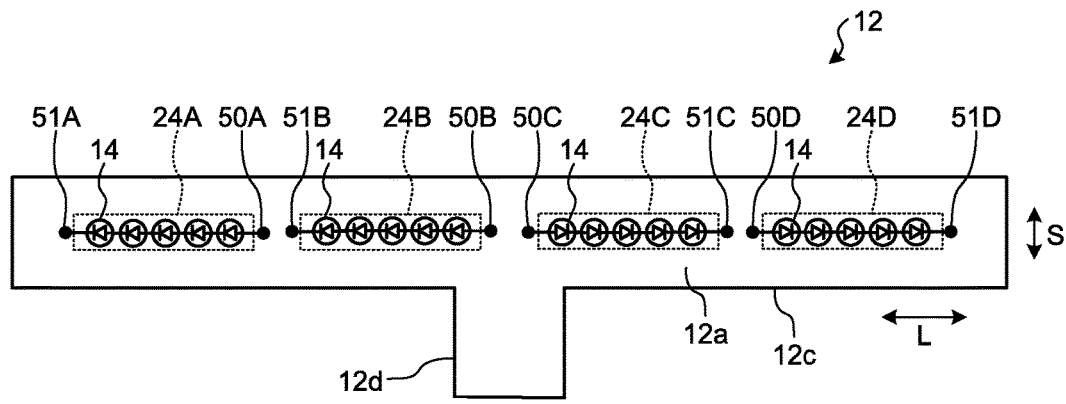
FIG. 5A is a front view that schematically illustrates the side of the installation surface of the board according to a comparative example 2.
Figure 5B:
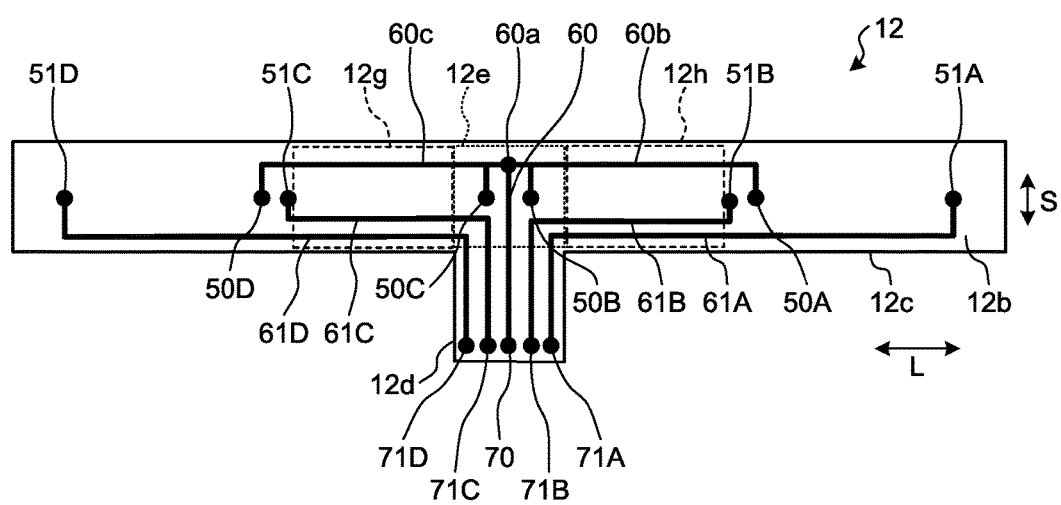
FIG. 5B is a front view that schematically illustrates the side of the wiring surface of the board according to the comparative example 2.

FIG. 5A is a front view that schematically illustrates the side of the installation surface 12a of the board 12 according to a comparative example 2, and FIG. 5B is a front view that schematically illustrates the side of the wiring surface 12b of the board 12 according to the comparative example 2.

Here, according to the comparative example 2, the orientations of the positive electrodes 50 and the negative electrodes 51 in all the light source units 24 are different from those in the embodiment. As other parts are the same as those in the embodiment, explanations for the same parts are omitted.

As illustrated in FIG. 5A, the positive electrodes 50A to 50D in the four light source units 24A to 24D are located closer to the external connection section 12*d* than the corresponding negative electrodes 51A to 51D. In this arrangement of the light source units 24A to 24D, the first wiring 60 and the second wiring 61A to 61D, connected to the light source units 24A to 24D, are arranged as illustrated in FIG. 5B.

Among the first wiring 60 that bifurcates at the contact point 60*a*, the first wiring 60*b*, which extends to the side where the light source units 24A, 24B are provided, further extends in the lateral direction S of the strip-shaped section 12*c* from the neighborhoods of the positive electrodes 50A, 50B, and then leads to the positive electrodes 50A, 50B, respectively.

Furthermore, among the first wiring 60 that bifurcates at the contact point 60*a*, the first wiring 60*c*, which extends to the side where the light source units 24C, 24D are provided, further extends in the lateral direction S of the strip-shaped section 12*c* from the neighborhoods of the positive electrodes 50C, 50D, and then leads to the positive electrodes 50C, 50D, respectively.

The second wiring 61A, connected to the negative electrode 51A of the light source unit 24A, extends in the lateral direction S along a direction toward the external connection section 12*d* and then extends in the longitudinal direction L along a direction toward the external connection section 12*d*. Then, the second wiring 61A is turned at the opposing area 12*e* in the lateral direction S along a direction toward the external connection section 12*d* to lead to the second terminal 71A.

The second wiring 61B, connected to the negative electrode 51B of the light source unit 24B, extends in the lateral direction S along a direction toward the external connection section 12*d* and then extends in the longitudinal direction L along a direction toward the external connection section 12*d*. Then, the second wiring 61B is turned at the opposing area 12*e* in the lateral direction S along a direction toward the external connection section 12*d* to lead to the second terminal 71B.

The second wiring 61C, connected to the negative electrode 51C of the light source unit 24C, extends in the lateral direction S along a direction toward the external connection section 12*d* and then extends in the longitudinal direction L along a direction toward the external connection section 12*d*. Then, the second wiring 61C is turned at the opposing area 12*e* in the lateral direction S along a direction toward the external connection section 12*d* to lead to the second terminal 71C.

The second wiring 61D, connected to the negative electrode 51D of the light source unit 24D, extends in the lateral direction S along a direction toward the external connection section 12*d* and then extends in the longitudinal direction L along a direction toward the external connection section 12*d*. Then, the second wiring 61D is turned at the opposing area 12*e* in the lateral direction S along a direction toward the external connection section 12*d* to lead to the second terminal 71D.

According to the comparative example 2 that provides the above-described wiring arrangement, the number of pieces of parallel wiring, which extend in the longitudinal direction L of the strip-shaped section 12*c* and are laid alongside in the lateral direction S, is three at a maximum. The three pieces of parallel wiring are made up of the first wiring 60*b*, the second wiring 61A, and the second wiring 61B at an area 12*h* from the edge of the opposing area 12*e* in the strip-shaped section 12*c* to the negative electrode 51B.

Furthermore, the three pieces of parallel wiring are also made up of the first wiring 60*c*, the second wiring 61C, and the second wiring 61D at an area 12*g* from the edge of the opposing area 12*e* in the strip-shaped section 12*c* to the negative electrode 51C.

As described above, according to the embodiment, the maximum number of pieces of wiring, which extend in the longitudinal direction L of the strip-shaped section 12*c* and are laid alongside in the lateral direction S, may be reduced if wiring is connected in parallel from the single external connection section 12*d* to the four light source units 24A to 24D, as compared to the comparative example 1 and the comparative example 2.

Thus, even if the width of the strip-shaped section 12*c* in the lateral direction S is reduced, parallel wiring may be laid without any problem. Therefore, according to the embodiment, as the width of the strip-shaped section 12*c* in the lateral direction S may be reduced, the planar lighting device 10 may be made thin even if the top-view type LED 14 is used.

According to the embodiment that is illustrated in FIG. 3A and FIG. 3B, all the second wiring 61A to 61D, connected to the negative electrodes 51A to 51D, are individually connected to the second terminals 71A to 71D. Thus, even if the light source units 24 have different voltage drop values, all the light source units 24 may emit light in a stable manner without being affected by the other light source units 24, as the second wiring 61 and the second terminal 71 at the side of the negative electrode are individually provided in each of the light source units 24.

Furthermore, failures, or the like, do not occur even if the first wiring 60 at the side of the positive electrode is common in a case where the light source units 24 have different voltage drop values. Moreover, as the first wiring 60 is common to all the light source units 24, the maximum number of pieces of wiring, which are laid alongside in the lateral direction S, may be reduced as compared to a case where the first wiring 60 is individually laid.

That is, according to the embodiment, as the first wiring 60 at the side of the positive electrode is common to all the light source units 24, the maximum number of pieces of wiring, which are laid alongside in the lateral direction S, may be further reduced.

Furthermore, according to the embodiment, the first wiring 60 leads from the first terminal 70 to the contact point 60*a* that is located adjacent to the long side of the strip-shaped section 12*c* at the opposite side of the long side, on which the external connection section 12*d* is provided, through the interval between the negative electrodes 51B, 51C of the light source units 24B, 24C in pair, which are adjacent to the external connection section 12*d*.

Thus, the first wiring 60 may be formed by only extending the wiring in the lateral direction S without extending it in the longitudinal direction L up to the position (here, the contact point 60*a*) that is adjacent to the long side of the strip-shaped section 12*c* at the opposite side of the long side where the external connection section 12*d* is provided. Therefore, when the first wiring 60 is commonly laid from the contact point 60*a* to all the positive electrodes 50, the number of pieces of the first wiring 60, which extend in the longitudinal direction L of the strip-shaped section 12*c* and are laid alongside in the lateral direction S, may be one.

That is, according to the embodiment, as the first wiring 60 passes through the interval between the negative electrodes 51B, 51C at the external connection section 12*d* to lead to the contact point 60*a*, the maximum number of pieces of wiring, which extend in the longitudinal direction L of the strip-shaped section 12*c* and are laid alongside in the lateral direction S, may be further reduced.

Furthermore, according to the embodiment, the negative electrodes 51B, 51C of the light source units 24B, 24C, which are adjacent to the external connection section 12d, are provided on the opposing area 12e, which is opposed to the external connection section 12d at the strip-shaped section 12c of the board 12. Thus, wiring formation may be achieved by only extending the second wiring 61B, which connects the negative electrode 51B and the second terminal 71B, and the second wiring 61C, which connects the negative electrode 51C and the second terminal 71C, in the lateral direction S without extending them in the longitudinal direction L.

That is, as the negative electrodes 51B, 51C of the light source units 24B, 24C, which are adjacent to the external connection section 12d, are provided on the opposing area 12e, the second wiring 61B, 61C may be formed without increasing the number of pieces of wiring that extend in the longitudinal direction L of the strip-shaped section 12c. Therefore, according to the embodiment, it is possible to further reduce the number of pieces of parallel wiring that extend in the longitudinal direction L of the strip-shaped section 12c and are laid alongside in the lateral direction S.

Modified Example

Figure 6B:
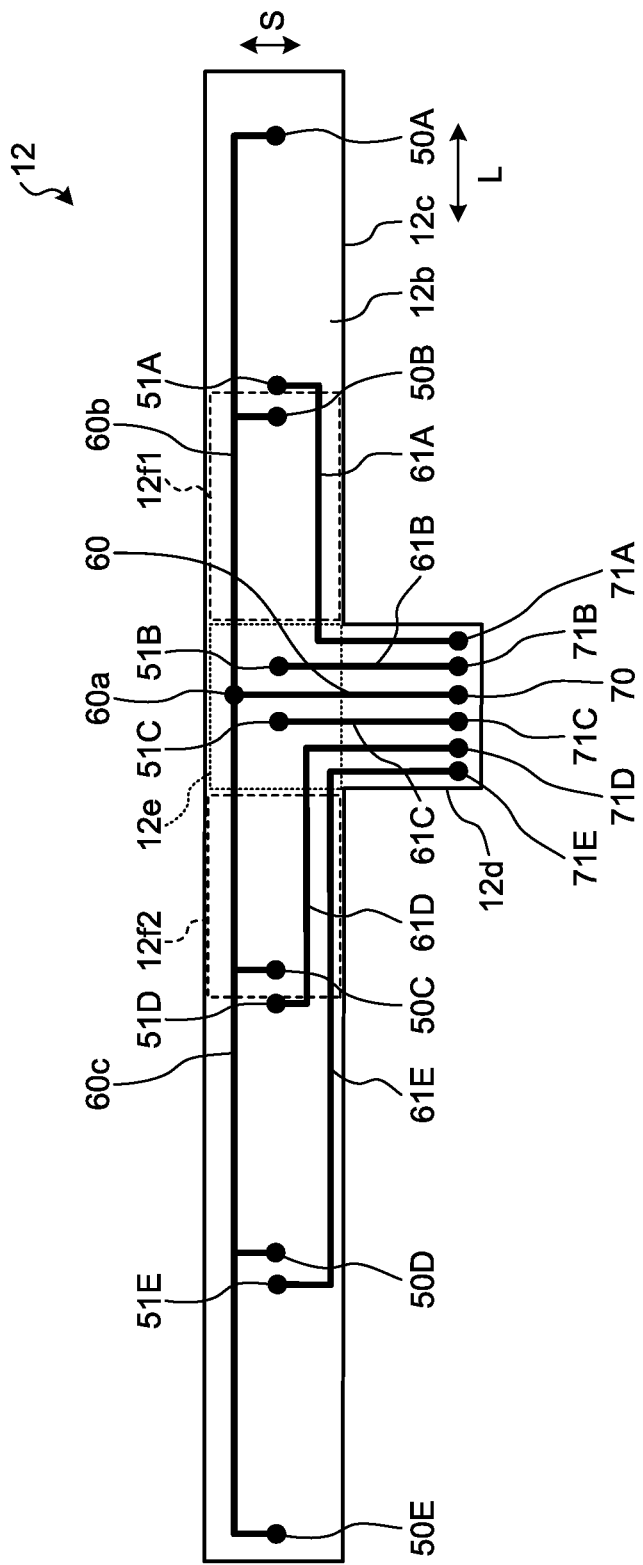
FIG. 6B is a front view that schematically illustrates the side of the wiring surface of the board according to the modified example 1 of the embodiment.

An explanation is given below of various modified examples of the board 12 according to the embodiment. FIG. 6A is a front view that schematically illustrates the side of the installation surface 12a of the board 12 according to a modified example 1 of the embodiment, and FIG. 6B is a front view that schematically illustrates the side of the wiring surface 12b of the board 12 according to the modified example 1 of the embodiment.

The board 12 according to the modified example 1 is different from that in the above-described embodiment in that a light source unit 24E is further added to the installation surface 12a and the five light source units 24 are provided. As other parts are the same as those in the embodiment, detailed explanations for the same parts are omitted.

As illustrated in FIG. 6A, the five light source units 24A to 24E, in which the LEDs 14 are connected in series, are provided on the installation surface 12a at the strip-shaped section 12c of the board 12.

Here, out of the five light source units 24A to 24E, the light source units 24A, 24B are provided on one side (the left side in FIG. 6A) of the strip-shaped section 12c with the external connection section 12d as a base point. Furthermore, the remaining light source units 24C to 24E are provided on the other side (the right side in FIG. 6A) of the strip-shaped section 12c with the external connection section 12d as a base point. That is, compared to the embodiment, the light source unit 24E is added to the position adjacent to the light source unit 24D.

The external connection section 12d is a section that protrudes in the lateral direction S of the strip-shaped section 12c from the area that is equivalent to the central part of the strip-shaped section 12c with respect to the longitudinal direction L. Furthermore, according to the modified example 1, as illustrated in FIG. 6A, the external connection section 12d is positioned by being shifted from the central position in the longitudinal direction L of the strip-shaped section 12c, and this is because an odd number (five) of the light source units 24 are arranged as evenly as possible on both sides of the strip-shaped section 12c.

Therefore, according to the present embodiment, even if the external connection section 12d is positioned by being shifted from the central position in the longitudinal direction L of the strip-shaped section 12c, it may be considered that the external connection section 12d is a section that protrudes in the longitudinal direction L of the strip-shaped section 12c from the area that is equivalent to the central part.

Furthermore, the positive electrodes 50A to 50E in the five light source units 24A to 24E are located farther from the external connection section 12d than the corresponding negative electrodes 51A to 51E. That is, in all the light source units 24, the negative electrode 51 is provided closer to the external connection section 12d than the corresponding positive electrode 50.

Next, with reference to FIG. 6B, an explanation is given of the configuration of wiring for supplying electric power to the five light source units 24A to 24E.

The first wiring 60 is connected to the positive electrode 50E of the light source unit 24E, which is added according to the modified example 1. As is the case with the embodiment, the first wiring 60 extends from the first terminal 70 in the lateral direction S of the strip-shaped section 12c, passes through the interval between the negative electrode 51B and the negative electrode 51C, and leads to the contact point 60a.

Furthermore, the first wiring 60 bifurcates at the contact point 60a to both end sides in the longitudinal direction L of the strip-shaped section 12c, and the bifurcated first wiring 60b, 60c extends in the longitudinal direction L. Furthermore, among the bifurcated first wiring 60, the first wiring 60c, which extends to the side where the light source units 24C to 24E are provided, further extends in the lateral direction S of the strip-shaped section 12c from the neighborhood of the positive electrode 50E to lead to the positive electrode 50E.

Furthermore, second wiring 61E is connected to the negative electrode 51E of the light source unit 24E that is added according to the modified example 1. The second wiring 61E extends in the lateral direction S along a direction toward the external connection section 12d and then extends in the longitudinal direction L along a direction toward the external connection section 12d. Then, the second wiring 61E is turned in the lateral direction S along a direction toward the external connection section 12d at the opposing area 12e of the strip-shaped section 12c to lead to a second terminal 71E.

Here, according to the modified example 1, the number of pieces of parallel wiring, which extend in the longitudinal direction L of the strip-shaped section 12c and are laid alongside in the lateral direction S, is three at a maximum. The three pieces of parallel wiring are made up of the first wiring 60c, the second wiring 61D, and the second wiring 61E at the area 12f2 from the edge of the opposing area 12e in the strip-shaped section 12c to the negative electrode 51D.

In this way, according to the modified example 1, if wiring is connected in parallel from the single external connection section 12d to the five light source units 24A to 24E, the number of pieces of parallel wiring, which extend in the longitudinal direction L of the strip-shaped section 12c and are laid alongside in the lateral direction S, may be three at a maximum.

Figure 7A:
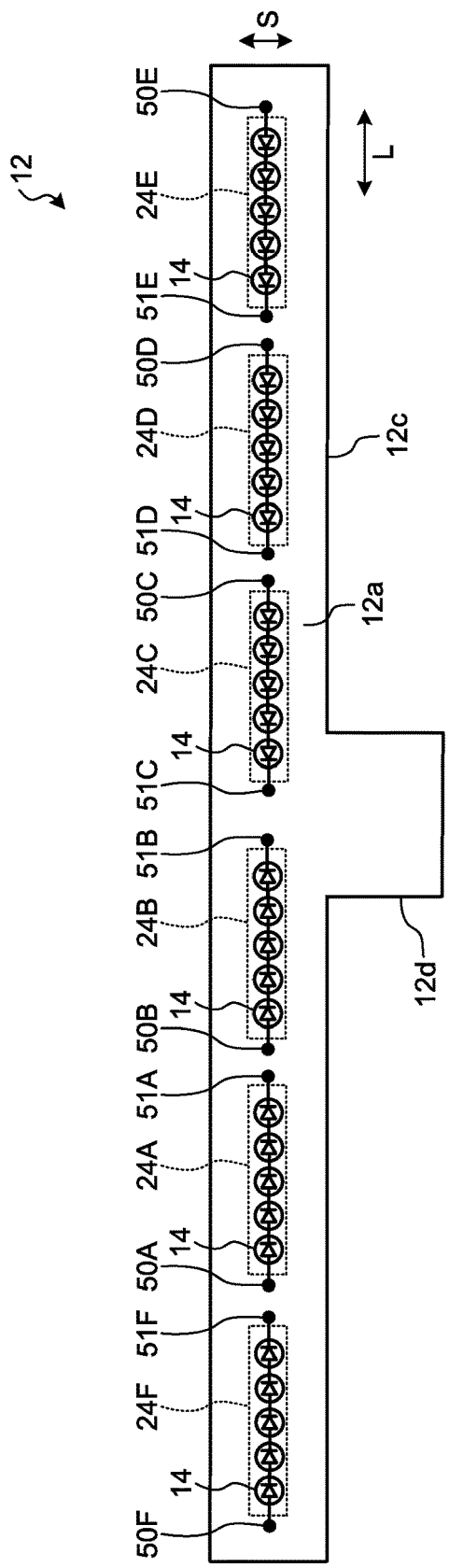
FIG. 7A is a front view that schematically illustrates the side of the installation surface of the board according to a modified example 2 of the embodiment.
Figure 7B:
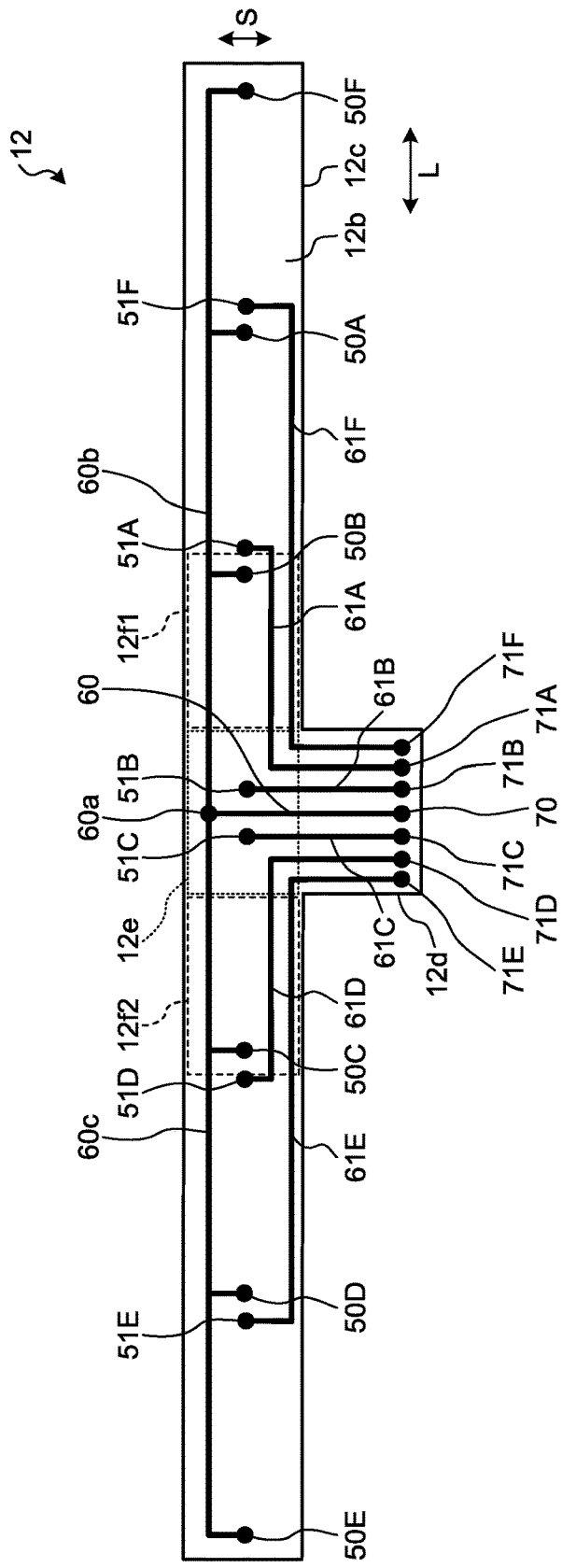
FIG. 7B is a front view that schematically illustrates the side of the wiring surface of the board according to the modified example 2 of the embodiment.

Next, with reference to FIG. 7A and FIG. 7B, an explanation is given of the board 12 according to a modified example 2 of the embodiment. FIG. 7A is a front view that schematically illustrates the side of the installation surface 12a of the board 12 according to the modified example 2 of the embodiment, and FIG. 7B is a front view that schematically illustrates the side of the wiring surface 12b of the board 12 according to the modified example 2 of the embodiment.

The board 12 according to the modified example 2 is different from that in the above-described modified example 1 in that a light source unit 24F is further added to the installation surface 12a and the six light source units 24 are provided. As other parts are the same as those in the modified example 1, detailed explanations for the other parts are omitted.

As illustrated in FIG. 7A, the six light source units 24A to 24F, in which the LEDs 14 are connected in series, are provided on the installation surface 12a at the strip-shaped section 12c of the board 12.

Here, out of the six light source units 24A to 24F, the light source units 24A, 24B, and 24F are provided on one side (the left side in FIG. 7A) of the strip-shaped section 12c with the external connection section 12d as a base point. Furthermore, the remaining light source units 24C to 24E are provided on the other side (the right side in FIG. 7A) of the strip-shaped section 12c with the external connection section 12d as a base point. That is, compared to the modified example 1, the light source unit 24F is added to the position adjacent to the light source unit 24A.

Furthermore, the positive electrodes 50A to 50F in the six light source units 24A to 24F are located farther from the external connection section 12d than the corresponding negative electrodes 51A to 51F. That is, in all the light source units 24, the negative electrode 51 is provided closer to the external connection section 12d than the corresponding positive electrode 50.

Next, with reference to FIG. 7B, an explanation is given of the configuration of wiring for supplying electric power to the six light source units 24A to 24F.

The first wiring 60 is connected to the positive electrode 50F of the light source unit 24F, which is added according to the modified example 2. As is the case with the modified example 1, the first wiring 60 extends from the first terminal 70 in the lateral direction S of the strip-shaped section 12c, passes through the interval between the negative electrode 51B and the negative electrode 51C, and leads to the contact point 60a.

Furthermore, the first wiring 60 bifurcates at the contact point 60a to both end sides in the longitudinal direction L of the strip-shaped section 12c, and the bifurcated first wiring 60b, 60c extend in the longitudinal direction L. Furthermore, among the bifurcated first wiring 60, the first wiring 60b, which extends to the side where the light source units 24A, 24B are provided, further extends in the lateral direction S of the strip-shaped section 12c from the neighborhood of the positive electrode 50F to lead to the positive electrode 50F.

Furthermore, a second wiring 61F is connected to the negative electrode 51F of the light source unit 24F that is added according to the modified example 2. The second wiring 61F extends in the lateral direction S along a direction toward the external connection section 12d and then extends in the longitudinal direction L along a direction toward the external connection section 12d. Then, the second wiring 61F is turned in the lateral direction S along a direction toward the external connection section 12d at the opposing area 12e of the strip-shaped section 12c to lead to a second terminal 71F.

Here, according to the modified example 2, the number of pieces of parallel wiring, which extend in the longitudinal direction L of the strip-shaped section 12c and are laid alongside in the lateral direction S, is three at a maximum. The three pieces of parallel wiring are made up of the first wiring 60b, the second wiring 61A, and the second wiring 61F at the area 12f1 from the edge of the opposing area 12e in the strip-shaped section 12c to the negative electrode 51A.

Furthermore, the three pieces of parallel wiring are also made up of the first wiring 60c, the second wiring 61D, and the second wiring 61E at the area 12f2 from the edge of the opposing area 12e in the strip-shaped section 12c to the negative electrode 51D.

In this way, according to the modified example 2, if wiring is connected in parallel from the single external connection section 12d to the six light source units 24A to 24F, the number of pieces of parallel wiring, which extend in the longitudinal direction L of the strip-shaped section 12c and are laid alongside in the lateral direction S, may be three at a maximum.

Figure 8A:
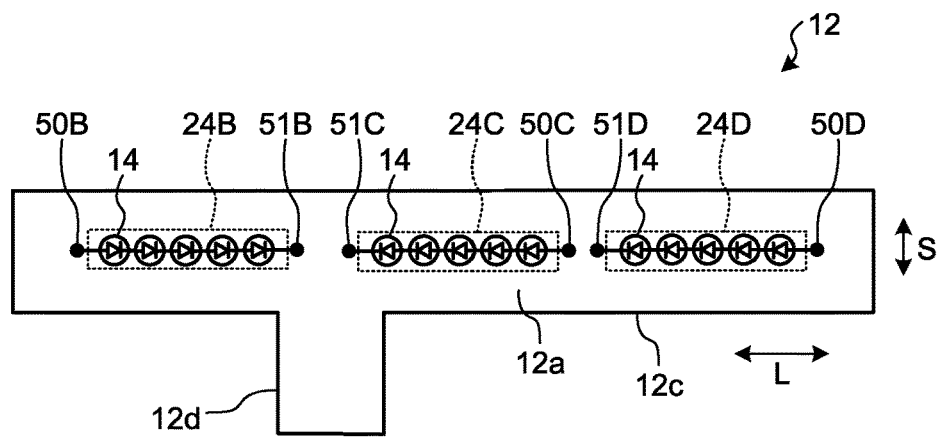
FIG. 8A is a front view that schematically illustrates the side of the installation surface of the board according to a modified example 3 of the embodiment.
Figure 8B:
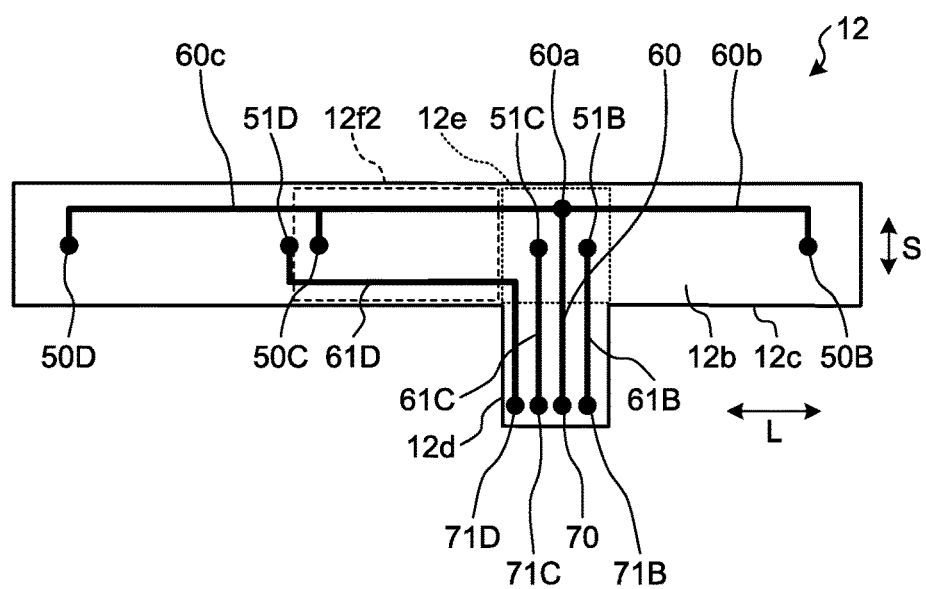
FIG. 8B is a front view that schematically illustrates the side of the wiring surface of the board according to the modified example 3 of the embodiment.

Next, with reference to FIG. 8A and FIG. 8B, an explanation is given of the board 12 according to a modified example 3 of the embodiment. FIG. 8A is a front view that schematically illustrates the side of the installation surface 12a of the board 12 according to the modified example 3 of the embodiment, and FIG. 8B is a front view that schematically illustrates the side of the wiring surface 12b of the board 12 according to the modified example 3 of the embodiment.

The board 12 according to the modified example 3 is different from that in the above-described embodiment in that the light source unit 24A is removed from the light source units 24A to 24D and the three light source units 24 are provided. As other parts are the same as those in the embodiment, detailed explanations for the other parts are omitted.

As illustrated in FIG. 8A, the three light source units 24B to 24D, in which the LEDs 14 are connected in series, are provided on the installation surface 12a at the strip-shaped section 12c of the board 12.

Here, out of the three light source units 24B to 24D, the light source unit 24B is provided on one side (the left side in FIG. 8A) of the strip-shaped section 12c with the external connection section 12d as a base point. Furthermore, the remaining light source units 24C, 24D are provided on the other side (the right side in FIG. 8A) of the strip-shaped section 12c with the external connection section 12d as a base point. That is, compared to the embodiment, the light source unit 24A at the position adjacent to the light source unit 24B is removed.

The external connection section 12d is a section that protrudes in the lateral direction S of the strip-shaped section 12c from the area that is equivalent to the central part of the strip-shaped section 12c with respect to the longitudinal direction L. Furthermore, according to the modified example 3, too, the external connection section 12d is positioned by being shifted from the central position in the longitudinal direction L of the strip-shaped section 12c, as is the case with the modified example 1, and this is because an odd number (three) of the light source units 24 are arranged as evenly as possible on both sides of the strip-shaped section 12c.

Therefore, according to the modified example 3, too, it may be considered that the external connection section 12d is a section that protrudes in the longitudinal direction L of the strip-shaped section 12c from the area that is equivalent to the central part, as is the case with the modified example 1.

Furthermore, the positive electrodes 50B to 50D in the three light source units 24B to 24D are located farther from the external connection section 12d than the corresponding negative electrodes 51B to 51D. That is, in all the light source units 24, the negative electrode 51 is provided closer to the external connection section 12*d* than the corresponding positive electrode 50.

Next, with reference to FIG. 8B, an explanation is given of the configuration of wiring for supplying electric power to the three light source units 24B to 24D.

Among the wiring that has been connected to the light source unit 24A, which has been removed according to the modified example 3, part of the first wiring 60, extending from the neighborhood of the positive electrode 50B to the positive electrode 50A, has been removed. Furthermore, the second wiring 61A, connected to the negative electrode 51A, has been removed together with the second terminal 71A.

Here, according to the modified example 3, the number of pieces of parallel wiring, which extend in the longitudinal direction L of the strip-shaped section 12*c* and are laid alongside in the lateral direction S, is two at a maximum. The two pieces of parallel wiring are made up of the first wiring 60*c* and the second wiring 61D at the area 12*f*2 from the edge of the opposing area 12*e* in the strip-shaped section 12*c* to the negative electrode 51D.

In this way, according to the modified example 3, if wiring is connected in parallel from the single external connection section 12*d* to the three light source units 24B to 24D, the number of pieces of parallel wiring, which extend in the longitudinal direction L of the strip-shaped section 12*c* and are laid alongside in the lateral direction S, may be two at a maximum.

As explained above in the embodiment and the modified examples 1 to 3, when the single external connection section 12*d* is provided for the light source units 24, if the number of the light source units 24 is 3 or 4, the number of pieces of parallel wiring, which extend in the longitudinal direction L of the strip-shaped section 12*c* and are laid alongside in the lateral direction S, may be two at a maximum.

Furthermore, when the single external connection section 12*d* is provided for the light source units 24, if the number of the light source units 24 is 5 or 6, the number of pieces of parallel wiring, which extend in the longitudinal direction L of the strip-shaped section 12*c* and are laid alongside in the lateral direction S, may be three at a maximum.

In this way, according to the embodiment, when the single external connection section 12*d* is provided for the N (N≥3) light source units 24, if N is an odd number, the number of pieces of parallel wiring, which extend in the longitudinal direction L of the strip-shaped section 12*c* and are laid alongside in the lateral direction S, may be (N+1)/2 at a maximum. Furthermore, if N is an even number, the number of pieces of parallel wiring, which extend in the longitudinal direction L of the strip-shaped section 12*c* and are laid alongside in the lateral direction S, may be N/2 at a maximum.

That is, according to the embodiment, when the single external connection section 12*d* is provided for the light source units 24, if the three or more light source units 24 are provided, the number of pieces of parallel wiring, which extend in the longitudinal direction L of the strip-shaped section 12*c* and are laid alongside in the lateral direction S, may be minimized.

Furthermore, according to the embodiment, as the single external connection section 12*d* needs to be provided for the light source units 24, the number of connection components for connecting the first terminal 70 and the second terminal 71 in the external connection section 12*d* to the external power source may be one pair. Therefore, it is possible to reduce the time needed to connect the connection component to the first terminal 70 and the second terminal 71 in the external connection section 12*d*, whereby the manufacturing costs may be reduced.

As described above, according to the embodiment, on the board 12 where the light source units 24 are provided for the single external connection section 12*d*, all the positive electrodes 50, connected to the first wiring 60 that is common wiring, are located farther from the external connection section 12*d* than the corresponding negative electrodes 51. Thus, the number of pieces of parallel wiring, which extend in the longitudinal direction L of the strip-shaped section 12*c* and are laid alongside in the lateral direction S, may be reduced so that the width of the strip-shaped section 12*c* in the lateral direction S may be smaller.

Furthermore, according to the above-described embodiment, the first electrode of the light source unit 24 is the positive electrode 50, and the second electrode is the negative electrode 51; however, the first electrode may be the negative electrode 51, and the second electrode may be the positive electrode 50. That is, all the negative electrodes 51 of the light source units 24 may be located farther from the external connection section 12*d* than the corresponding positive electrodes 50.

Furthermore, the above-described embodiment describes what is called the top-view type LED emission device, in which the installation surface 12*a* of the board 12 and the emission surface 14*a* of the LED 14 face the same direction; however, this example is not a limitation. For example, the above-described embodiment may be applied to what is called a side-view type LED emission device, in which the installation surface 12*a* of the board 12 is substantially perpendicular to the emission surface 14*a*.

Furthermore, according to the above-described embodiment, the surface of the board 12 at the opposite side of the installation surface 12*a* is used as the wiring surface 12*b*, and the first wiring 60 and the second wiring 61 are provided on the wiring surface 12*b*; however, the wiring surface 12*b* is not always the surface of the board 12 at the opposite side of the installation surface 12*a*.

For example, the board 12 may be structured with a multi-layer FPC, and an intermediate layer, formed inside the multi-layer FPC, may be used as the wiring surface 12*b*. In this way, the intermediate layer of the multi-layer FPC is used as the wiring surface 12*b* so that, for example, an insulating layer and a radiator metal layer may be laminated on the surface of the board 12 at the opposite side of the installation surface 12*a*. Furthermore, because of the addition of the insulating layer and the radiator metal layer, the board 12 with further improved radiation performance may be achieved. Furthermore, the intermediate layer is not always single-layered but may be multi-layered.

Furthermore, according to the above-described embodiment, the board 12 is provided with the single external connection section 12*d*; however, the board 12 is not always provided with the single external connection section 12*d*.

For example, if the eight light source units 24 are provided on the board 12, the single external connection section 12*d* (that is, the two external connection sections 12*d* in total) is provided for the four light source units 24; thus, as described in the embodiment, the number of pieces of parallel wiring, which extend in the longitudinal direction L of the strip-shaped section 12*c* and are laid alongside in the lateral direction S, is two at a maximum.

In this manner, the number of the external connection sections 12*d* is appropriately adjusted in accordance with the number of the installed light source units 24; thus, it is possible to achieve both a reduction in the thickness of the planar lighting device 10 and a reduction in manufacturing costs.

As described above, the planar lighting device 10 according to the embodiment includes the board 12, the light source units 24, the first wiring 60, and the second wiring 61. The board 12 includes the strip-shaped section 12c, which has a strip shape, and the external connection section 12d, which protrudes from the central part of the strip-shaped section 12c in the lateral direction S of the strip-shaped section 12c, and it is provided with the installation surface 12a, which is one principal surface, and the wiring surface 12b, which is a surface at the opposite side of the installation surface 12a. The light source units 24 are provided with a plurality of light sources (the LEDs 14) connected in series, each of them is provided with the first electrode (the positive electrode 50) and the second electrode (the negative electrode 51) on both end sides, they are arranged side by side on the installation surface 12a at the strip-shaped section 12c of the board 12 in the longitudinal direction L of the strip-shaped section 12c, and the emission surface 14a of the light source (the LED 14) is opposed to the side surface 15a of the light guide plate 15. The first wiring 60 is provided on the wiring surface 12b of the board 12, and it is commonly connected between the external connection section 12d and the first electrode (the positive electrode 50). The second wiring 61 is provided on the wiring surface 12b of the board 12, and it is connected between the external connection section 12d and the second electrode (the negative electrode 51). Furthermore, the single external connection section 12d is provided for the light source units 24, and the first electrodes (the positive electrodes 50) in all the light source units 24, related to the single external connection section 12d, are located farther from the external connection section 12d than the second electrodes (the negative electrodes 51) in the light source units 24. Thus, even if the top-view type LED 14 is used, the planar lighting device 10 may be made thin. Furthermore, if the side-view type LED is used, it is possible to achieve slim bezel at the light entrance side of the planar lighting device.

Furthermore, in the planar lighting device 10 according to the embodiment, the second wiring 61 is provided, and the second wiring 61 is individually connected between the external connection section 12d and the second electrodes (the negative electrodes 51). Thus, all the light source units 24 may emit light in a stable manner.

Furthermore, in the planar lighting device 10 according to the embodiment, the first wiring 60 extends from the external connection section 12d to the position (the contact point 60a), which is adjacent to the long side of the strip-shaped section 12c at the opposite side of the long side where the external connection section 12d is provided, via the interval between the second electrodes (the negative electrodes 51B, 51C) of the light source units 24B, 24C in pair, which are adjacent to the external connection section 12d. Thus, the maximum number of pieces of wiring, which extend in the longitudinal direction L of the strip-shaped section 12c and are laid alongside in the lateral direction S, may be further reduced.

Furthermore, in the planar lighting device 10 according to the embodiment, the second electrodes (the negative electrodes 51B, 51C) of the light source units 24B, 24C, which are adjacent to the external connection section 12d, are provided on the opposing area 12e, which is opposed to the external connection section 12d at the strip-shaped section 12c of the board 12. Thus, the number of pieces of wiring, which extend in the longitudinal direction L of the strip-shaped section 12c and are laid alongside in the lateral direction S, may be further reduced.

Furthermore, in the planar lighting device 10 according to the embodiment, the three or more light source units 24 are provided for the single external connection section 12d. Thus, the number of pieces of parallel wiring, which extend in the longitudinal direction L of the strip-shaped section 12c and are laid alongside in the lateral direction S, may be minimized.

Furthermore, in the planar lighting device 10 according to the embodiment, the first electrode is the positive electrode 50, and the second electrode is the negative electrode 51; thus, all the light source units 24 may emit light in a stable manner.

According to an aspect of the present invention, a reduction in the thickness may be achieved even if a top-view type LED is used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device comprising:
   a board that includes a strip-shaped section, which has a strip shape, and an external connection section, which protrudes from a central part of the strip-shaped section in a lateral direction of the strip-shaped section, and that is provided with an installation surface, which is one principal surface, and a wiring surface, which is a surface at an opposite side of the installation surface;
   a plurality of light source units that are provided with a plurality of light sources connected in series, that are each provided with a first electrode and a second electrode on both end sides thereof, and that are arranged side by side on the installation surface at the strip-shaped section of the board in a longitudinal direction of the strip-shaped section, an emission surface of the light source being opposed to a side surface of a light guide plate;
   first wiring that is provided on the wiring surface of the board and that is commonly connected between the external connection section and the first electrode; and
   second wiring that is provided on the wiring surface of the board and that is connected between the external connection section and the second electrode, wherein
   the single external connection section is provided for the light source units, and
   the first electrodes in all the light source units, related to the single external connection section, are located farther from the external connection section than the second electrodes of the light source units.

2. The planar lighting device according to claim 1, wherein
   the second wiring is provided, and
   the second wiring is individually connected between the external connection section and the second electrodes.

3. The planar lighting device according to claim 1, wherein the first wiring extends from the external connection section to a position adjacent to a long side of the strip-shaped section at an opposite side of a long side where the external connection section is provided, via an interval between the second electrodes of the light source units in pair, which are adjacent to the external connection section.

4. The planar lighting device according to claim 1, wherein the second electrodes of the light source units in pair, which are adjacent to the external connection section, are provided on an opposing area that is opposed to the external connection section at the strip-shaped section of the board.

5. The planar lighting device according to claim 1, wherein the three or more light source units are provided for the single external connection section.

6. The planar lighting device according to claim 1, wherein the first electrode is a positive electrode, and the second electrode is a negative electrode.

* * * * *